United States Patent [19]
Magnusson

[11] Patent Number: 6,122,499
[45] Date of Patent: Sep. 19, 2000

[54] SYSTEM AND/OR METHOD FOR CALL INTERCEPT CAPABILITY IN A GLOBAL MOBILE SATELLITE COMMUNICATIONS SYSTEM

[75] Inventor: Oskar S. Magnusson, Silver Spring, Md.

[73] Assignee: Iridium, L.L.C., Washington, D.C.

[21] Appl. No.: 09/127,761

[22] Filed: Jul. 31, 1998

[51] Int. Cl.[7] .......................... H04M 15/00; H04M 1/24; H04Q 7/20; H04B 7/185
[52] U.S. Cl. ........................... 455/405; 379/35; 455/430; 455/12.1
[58] Field of Search .................................... 455/430, 405, 455/410, 422, 427, 428, 560, 12.1; 379/34, 35, 7, 1

[56] References Cited

U.S. PATENT DOCUMENTS

| | | | |
|---|---|---|---|
| 5,428,667 | 6/1995 | Easterling et al. | 455/410 |
| 5,589,834 | 12/1996 | Weinberg | 342/354 |
| 5,710,971 | 1/1998 | Armbruster et al. | 379/35 |
| 5,913,161 | 6/1999 | Ozulkulu et al. | 455/405 |
| 5,930,698 | 7/1999 | Bertacchi | 455/405 |
| 5,937,345 | 8/1999 | McGowan et al. | 455/410 |
| 5,960,324 | 9/1999 | Mattera | 379/35 |

*Primary Examiner*—Dwayne D. Bost
*Assistant Examiner*—Tracy M. Legree
*Attorney, Agent, or Firm*—Pepper Hamilton LLP

[57] ABSTRACT

An apparatus for providing a call interception capability includes a master call intercept database storing records of subscribers of a global mobile satellite communications system targeted for call interception by law enforcement agencies. The apparatus also has a visitor location register storing records of subscribers currently registered within a serviceable vicinity of a gateway earth station associated with said visitor location register. The apparatus further includes a target database storing records of registered subscribers targeted for call interception, and an intercept coordinator communicating with the master call intercept database and the visitor location register. The intercept coordinator stores in the target database a record of a targeted subscriber, when the visitor location register includes a corresponding record of the targeted subscriber. The intercept coordinator optionally removes a record of a targeted subscriber from the target database, when the visitor location register does not include a record of the targeted subscriber.

15 Claims, 7 Drawing Sheets

SYSTEM AND/OR METHOD FOR CALL INTERCEPT CAPABILITY IN A GLOBAL MOBILE SATELLITE COMMUNICATIONS SYSTEM

FIELD OF THE INVENTION

The present invention pertains generally to a system and/or method for call intercept, and more particularly to a system and/or method for call intercept in a global mobile satellite communications system.

BACKGROUND OF THE INVENTION

Present global mobile satellite communications systems, such as that disclosed in European Patent Application 0,365, 885 A2 to Bertiger, et al. and IRIDIUM® Licensing Technical Information Document, Iridium LLC, both incorporated herein by reference, include interfaces with cellular telephone and data transmission equipped users, as well as interfaces with users of the public switched telephone network.

By way of example, a global mobile satellite communications system, as shown in FIG. 1, consists of, for example, satellites 50, 52, 54, 56 and related infrastructure including master control facility 60, back-up control facilility 62 and associated tracking, telemetry, and control facilities. The space portion utilizes a constellation of 66 operational satellites (of which only four are shown) in low-Earth orbit. The satellites 50, 52, 54, 56 are placed in, for example, six distinct planes in near polar orbit at an altitude of approximately 780 kilometers and circle the Earth.

The satellites 50, 52, 54, 56 are significantly closer to the Earth than geostationary satellites which orbit at nominal altitudes of 35,800 kilometers. The low orbit of the satellites 50, 52, 54, 56 enables the global mobile satellite communications system to achieve, with comparatively smaller main mission antennas, its link-margins permitting effective communications with portable, hand-held Individual Subscriber Units 60, 68 and other L-Band subscriber equipment 62, 64, 66 (hereinafter collectively ISUs).

Each satellite 50, 52,54, 56 communicates with ISUs 60, 62, 64, 66, 68 using main mission antennas and with other satellites in space using cross-link antennas. The global mobile satellite communications system operates, for example, in the frequency bands 1616–1626.5 MHZ for the subscriber links, 19.4–19.6 GHz and 29.1–29.3 GHz for the gateway earth station 70 links, and 23.1823.38 GHz for the inter-satellite links. The actual frequencies, within these ranges, used by the system are a matter of national regulatory approval and international frequency coordination.

Each satellite includes three phased array antennas, each containing an array of transmit/receive modules. The main mission antenna subsystem communicates with ISUs 60, 62, 64, 66, 68 through tightly focused antenna beams that form a continuous pattern on the Earth's surface.

FIG. 2 depicts a satellite beam footprint, wherein the beams 1–48 collectively produced by a single satellite combine to cover a substantially circular area with a diameter of approximately 4,700 kilometers. The global mobile satellite communications system architecture incorporates certain characteristics, such as call hand-off, which allow the space portion communications link with subscriber equipment to be transferred from beam to beam and from satellite to satellite, as such satellites move over the area where the subscriber is located.

The cross-link antennas permit satellites 50, 52, 54, 56 in the constellation to send traffic from one satellite to another. Each satellite has four cross-link antennas to allow it to communicate and route traffic to the two satellites that are fore and aft of it in the same orbital plane as well as neighboring satellites in the adjacent co-rotating orbital planes. Such inter-satellite networking provides benefits such as enhanced system reliability and capacity, and reduces the number of gateway earth stations 70 required to provide global coverage.

Inter-satellite networking provides access to the global mobile satellite communications system (to make or to receive calls) irrespective of gateway earth station location by routing a call from satellite to satellite until it is connected to the gateway earth station 70 that is most appropriate for the destination of the particular call. This feature also enhances the reliability of the service by permitting the global mobile satellite communications system to route calls around gateway earth stations 70 or satellites 50, 52, 54, 56 where required in the event of a malfunction, emergency, or other operational requirements.

The satellite constellation is monitored, managed and controlled by the system control facilities. The master control facility 60 is located, for example, in the eastern United States. The back-up control facility 62 is located, for example, in Italy. The tracking, telemetry, and control stations are located, for example, in northern Canada and Hawaii, and a transportable tracking station is located, for example, in Iceland. These facilities manage the performance and status of the individual satellites 50, 52, 54, 56.

The master control facility 60 also manages the network by developing and distributing routing tables for use by the satellites 50, 52, 54, 56 and gateway earth stations 70, directing traffic routing though the network, and controlling cell formation by the satellite main mission antennas. In addition, the master control facility 60 schedules gateway earth stations 70 to contact satellites and controls data flow between the master 60 and back-up 62 control facilities.

Gateway earth stations 70 provide call processing and control activities such as subscriber validation and access control for all calls placed in a gateway earth station territory. Each gateway earth station 70 also provides interconnection between Public Switched Telephone Networks (PSTNs) 80 and the global mobile satellite communications system by connecting calls made through the global mobile satellite communications system to and from the local PSTNs 80. Gateway earth stations 70 communicate with the space portion via gateway earth station link antennas on the satellites 50, 52, 54, 56 and ground-based antennas, or earth terminals, at each terrestrial gateway earth station facility.

Each gateway earth station facility 70 typically includes three antennas, a controller to manage communications with the constellation, an operations center to perform local network management, a paging message origination controller, and a switch that connects the gateway earth station to PSTNs 80 within the gateway earth station territory. As shown in FIG. 3, each gateway earth station 70 includes a visitor location register 130 used in call processing activities such as subscriber validation. Each gateway earth station 70 also keeps a record of all traffic in its territory and generates call detail records used in billing.

Call Processing in the global mobile satellite communications system consists of Acquisition, Access, Auto-Registration, Registration, Telephony, and Handoff.

Acquisition is the process of an ISU 60, 62, 64, 66, 68 obtaining a bi-directional communications channel, called a Traffic Channel, between the ISU and a satellite. The process is initiated either by the ISU user 60, 62, 64, 66, 68 taking some action to request a service that requires such a channel, or by the ISU 60, 62, 64, 66, 68 responding to a Ring Alert that notifies the ISU of an incoming call. Acquisition by an ISU 60, 62, 64, 66, 68 is necessary for registration, call setup, answering call terminations, or to initiate any service on the global mobile satellite communications system.

The Access process determines the location of the ISU 60, 62, 64, 66, 68 relative to Service Control Areas defined, for example, in earth fixed coordinates. Based on the Service Control Area within which the ISU 60, 62, 64, 66, 68 is found and on the identity of the ISU's access code, a decision is made regarding whether to allow service, and which gateway earth station 70 should provide that service. The Access process is initiated immediately following Acquisition.

Location information may be reported by the ISU 60, 62, 64, 66, 68 based on an external source such as Global Positioning System (GPS) or an aircraft navigation system, for example. Service is denied if the global mobile satellite communications system determines that the ISU 60, 62, 64, 66, 68 is in an unauthorized area.

Auto-registration refers to the capability of an ISU 60, 62, 64, 66, 68 to re-register with the network on an as needed basis. The ISU 60, 62, 64, 66, 68 automatically re-registers with the system when it knows its current location exceeds a specified distance from the point it last registered. In order to make this decision, the ISU 60, 62, 64, 66, 68 passively estimates both its location and its positional error, based upon information gathered from the ring channel of the passing satellites. The ring channel is, for example, a downlink-only channel, e.g., simplex, used to send Ring Alert messages to ISUs 60, 62, 64, 66, 68. Its downlink frequency is preferably globally allocated in order to be the same known frequency throughout the world. The ring channel uses, for example, a time division format to send Ring Alert messages to multiple subscriber units in a single frame.

Registration is the process of an ISU 60, 62, 64, 66, 68 communicating its location to the system, and requires the prior completion of the Acquisition and Access processes. The Registration process allows the network to maintain an estimate of the location of roaming users as part of mobility management. This location estimate is required to allow the network to notify the subscriber when an incoming call is available (e.g., 'ring' an ISU 60, 62, 64, 66, 68 for a mobile terminated call). The ISU 60, 62, 64, 66, 68 must be registered in the gateway earth station 70 serving its location to initiate or terminate a call.

Telephony is the process of creating a connection between two telephones, at least one of which is an ISU 60, 62, 64, 66, 68, and of severing the connection at the end of the call. A call may originate or terminate at an ISU 60, 62, 64, 66, 68. Calls may be made between ISUs 60, 62, 64, 66, 68, or between an ISU and a Public Switched Telephone Network (PSTN) 80 subscriber. Multi-party services are also provided. Telephony includes the process of alerting an ISU 60, 62, 64, 66, 68 to an incoming call. Origination or termination of a call by an ISU 60, 62, 64, 66, 68 requires the prior completion of Acquisition and Access. Telephony protocols in the global mobile satellite communications system are, for example, patterned after the Global System for Mobile Communications (GSM) standard.

The global mobile satellite communications system satellites have highly directional antennas providing global mobile satellite communications system access to ISUs 60, 62, 64, 66, 68. These antennas are configured to project multiple beams onto the surface of the earth. Handoff is the process of an ISU 60, 62, 64, 66, 68 moving from its current Traffic Channel to a different Traffic Channel, usually because satellite motion has resulted in the current Traffic Channel no longer being suitable for continuing service. The handoff process is required in at least three situations:

1. An ISU 60, 62, 64, 66, 68 must be handed off between satellites as they move relative to the ISU (Inter-satellite hand-off).
2. An ISU 60, 62, 64, 66, 68 must be handed off between beams on a satellite as beam patterns move relative to the ISU (Intra-satellite hand-off).
3. As the inter-satellite geometry changes, radio channels are reallocated among the beams to manage interference. This process can cause an ISU 60, 62, 64, 66, 68 to be handed off to a different channel in the same beam (Intra-beam hand-off).

The satellite regularly provides updated lists of candidate beams for handoff, referred to as Candidate Beam Lists, to ISUs 60, 62, 64, 66, 68. A Candidate Beam List tells an ISU 60, 62, 64, 66, 68 which broadcast channels should be monitored in preparation for handoff. An ISU 60, 62, 64, 66, 68 typically initiates handoff when it detects that one of the candidate beams is likely to offer a better quality of service than the current beam.

The temporary ITU Document 8D-SRG/TEMP/6 (Rev. 1), incorporated herein by reference, was used to establish the appropriate required parameters for the global mobile satellite communications system, as well as the ETSI preliminary standard pr ETS 300 733, incorporated herein by reference.

Global mobile satellite communications system ISUs 60, 62, 64, 66, 68 comply with the applicable standards and requirements, including ITU and European Telecommunications Standards Institute (ETSI) standards as well as applicable FCC requirements. The FCC requirements include Part 25 of the FCC Rules, and Amendment of the Commission's Rules to Establish Rules and Policies Pertaining to a Mobile Satellite Service in the 1610–1626.5/ 2488.5–2500 MHZ Frequency Bands, Report and Order, 9 FCC Rcd 5936 (1994), all of which are hereby incorporated by reference.

Many of the system parameters associated with the ISU-satellite L-Band interface have been described previously, but are repeated here for convenience. Additional parameters and characteristics associated with ISUs 60, 62, 64, 66, 68 are provided below.

The L-Band interface is designed with, for example, an FDMA/TDMA/TDD system architecture and with an FDMA channel separation of 41.666 kHz in the 1616 to 1626.5 MHZ frequency band. The TDMA/TDD structure is based on a 90 milli-second frame and is composed of a 20.32 milli-second simplex time-slot, followed by four 8.28 milli-second uplink time slots and four 8.28 milli-second down link time-slots, with various guard times interspersed. The modulation used is, for example, DEQPSK, with square root raised cosine filtering using a rolloff factor of 0.4. The data rate is, for example, 50 kbps. The occupied bandwidth (unless otherwise permitted by the ITU definition) preferably does not exceed 31.5 kHz. The FCC authorized bandwidth is 41.67 kHz. The ITU emission designator is 41k7Q7W.

ISUs 60, 62, 64, 66, 68 are capable of operating from 1616.0–1626.0 MHZ; however the actual frequencies used are in accordance with regional spectral licenses and international frequency coordination.

The ISU transmitter frequency stability preferably does not exceed approximately 1.5375 ppm, 1.5 ppm being typical. The ISU permitted frequency deviation preferably does not exceed approximately 26.3 ppm, based on 37.5 kHz maximum Doppler and 5 kHz frequency accuracy.

The ISU antenna uses, for example, Right Hand Circular Polarization, and provides a maximum gain of approximately 3.5 dBic from 8.2 to 90 degrees elevation, and a maximum gain of approximately 0 dBic at 0 degree elevation.

In accordance with the Final Acts of the 1995 World Radio Conference (WRC-95), the maximum Effective Isotropic Radiated Power (EIRP) transmitted by an ISU 60, 62, 64, 66, 68, averaged over a 90 milli-second frame, does not exceed approximately −3 dBW/4kHz within any sub-band of the band in which it is intended to operate. ISU transmissions are power controlled over a minimum range of approximately 8 dB in 1 dB increments.

The ISU G/T is a maximum of approximately −20.5 dB/K, based on a 250 K receiving system noise temperature with a maximum gain of approximately 3.5 dBiC.

I have determined that it would be desirable to have a system and/or a method for effectively increasing the number of subscribers that can be subject to a call intercept in a global mobile satellite communications system without substantially increasing the effective size of a telephony intercept list.

I have determined that it would be desirable to have a system and/or a method for minimizing the amount of call set-up time needed to verify whether any call is subject to a call intercept in a global mobile satellite communications system without effectively increasing the size of the telephony intercept list.

It is also desirable to have a system and/or method that is capable of handling an increased number of subscribers subject to a call intercept in a global mobile satellite communications system.

SUMMARY OF THE INVENTION

It is, therefore, a feature and advantage of the instant invention to provide a system and/or a method for effectively increasing the number of subscribers that can be subject to a lawful call intercept without increasing the size of the telephony intercept list.

It is another feature and advantage of the instant invention to provide a system and/or a method for minimizing the amount of call set-up time needed to verify whether any call is subject to a call intercept without effectively increasing the size of the telephony intercept list.

It is also a feature and advantage of the instant invention to provide a system and/or method that is capable of handling an increased number of subscribers subject to a call intercept in a global mobile satellite communications system.

It is another feature and advantage of the present invention in providing an efficient and fast call intercept process.

It is also a feature and advantage of the present invention to provide a system and/or method that is not an integrated part of the telephony switching element (MSC), thereby providing a modular functionality that is more adaptable to system enhancements, sizing, and configurability.

More specifically, the instant invention provides an apparatus for providing a lawful interception capability in a global mobile satellite communications system. The global mobile satellite communications system includes communicatively linked satellites communicating with mobile users and gateway earth stations operatively and optionally connecting the satellites to public switched telephone networks. The mobile users optionally communicate with public switched telephone network users via the gateway earth stations.

The apparatus includes a master call intercept database storing records of subscribers of the global mobile satellite communications system targeted for call interception by, for example, law enforcement agencies. The apparatus also has a visitor location register storing records of subscribers currently registered within a serviceable vicinity in the satellite communications system, and optionally a gateway earth station associated with the visitor location register. The apparatus further includes a target database storing records of registered subscribers targeted for lawful call interception.

The instant invention also advantageously has an intercept coordinator communicating with the master call intercept database and the visitor location register. The intercept coordinator stores in the target database a record of a targeted subscriber, if the visitor location register includes a corresponding record of the targeted subscriber. The intercept coordinator optionally removes a record of a targeted subscriber from the target data base, if the visitor location register does not include a record of the targeted subscriber.

The apparatus may further include first registration device or process for receiving, periodically or aperiodically, a control signal from a subscriber in the vicinity of a gateway earth station and for updating the visitor location register to register the subscriber. Alternatively, the apparatus further include second registration device or process for polling, periodically or aperiodically, a subscriber in the vicinity of a gateway earth station and for updating the visitor location register to register the subscriber.

The apparatus optionally further provides a passive connection in the gateway earth station such that a voice or data call made by, or routed to, a registered, targeted subscriber includes routing via the passive connection to a law enforcement monitoring facility.

In accordance with another embodiment of the instant invention to embody a method of providing an interception capability in a global mobile satellite communications system is provided. The global mobile satellite communications system includes communicatively linked satellites communicating with mobile users and gateway earth stations operatively and optionally connecting the satellites to public switched telephone networks. The mobile users communicate with public switched telephone network users via the gateway earth stations.

The method includes the following sequential, non-sequential, or independent steps. A record of each of at least one call intercept target is entered into a master call intercept database. An intercept coordinator is provided with a record of the call intercept target. Whether the call intercept target is currently registered in a respective network served by a respective gateway earth station is confirmed with a visitor location register, using the intercept coordinator. A record of the call intercept target is entered into a target database, if the call intercept target is currently registered in the network, using the intercept coordinator. The intercept coordinator selects a record of another call intercept target from the master call intercept database. As needed, a passive connection in the gateway earth station is provided such that a voice or data call made by or routed to a registered, targeted subscriber includes routing via the passive connection to a monitoring facility.

The above steps are repeated until all the records of the master call intercept database have been selected at least once. The inventive method optionally further includes the step of removing from the target database a record of a call intercept target not currently registered in the network.

The method may further include the step of receiving, periodically or aperiodically, a control signal from a subscriber in the vicinity of a gateway earth station, and updating the visitor location register to register the subscriber. The method, alternatively, may further include the step of polling, periodically or aperiodically, a subscriber in the vicinity of a gateway earth station, and updating the visitor location register to register the subscriber.

The apparatus of the instant invention optionally includes the entering of a record of a call intercept target into a master database. The apparatus includes means for providing an intercept coordinator with a record of the call intercept target. The apparatus further includes means for confirming with a visitor location register, using the intercept coordinator, whether the call intercept target is currently registered in a respective network served by a respective gateway earth station. The invention enters the record of the call intercept target into a target database, if the call intercept target is currently registered in the network, using the intercept coordinator. The above steps are repeated until all records in the master call intercept database have been selected at least once.

The apparatus optionally further includes means for providing, as needed, a passive connection in the gateway earth station such that a voice or data call made by, or routed to, a registered, targeted subscriber includes routing the intercepted call to a law enforcement monitoring facility. The apparatus optionally further comprises means for removing from the target database a record of a call intercept target not currently registered in the network.

The apparatus optionally further comprises a device and/or a process for receiving, either periodically or aperiodically, a control signal from a subscriber in the vicinity of a gateway earth station and for updating the visitor location register to register the subscriber. The apparatus alternatively or optionally further comprises means for polling, one of periodically and aperiodically, a subscriber in the vicinity of a gateway earth station, and updating the visitor location register to register the subscriber.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BEST MODE FOR CARRYING OUT THE INVENTION

Figure 1:
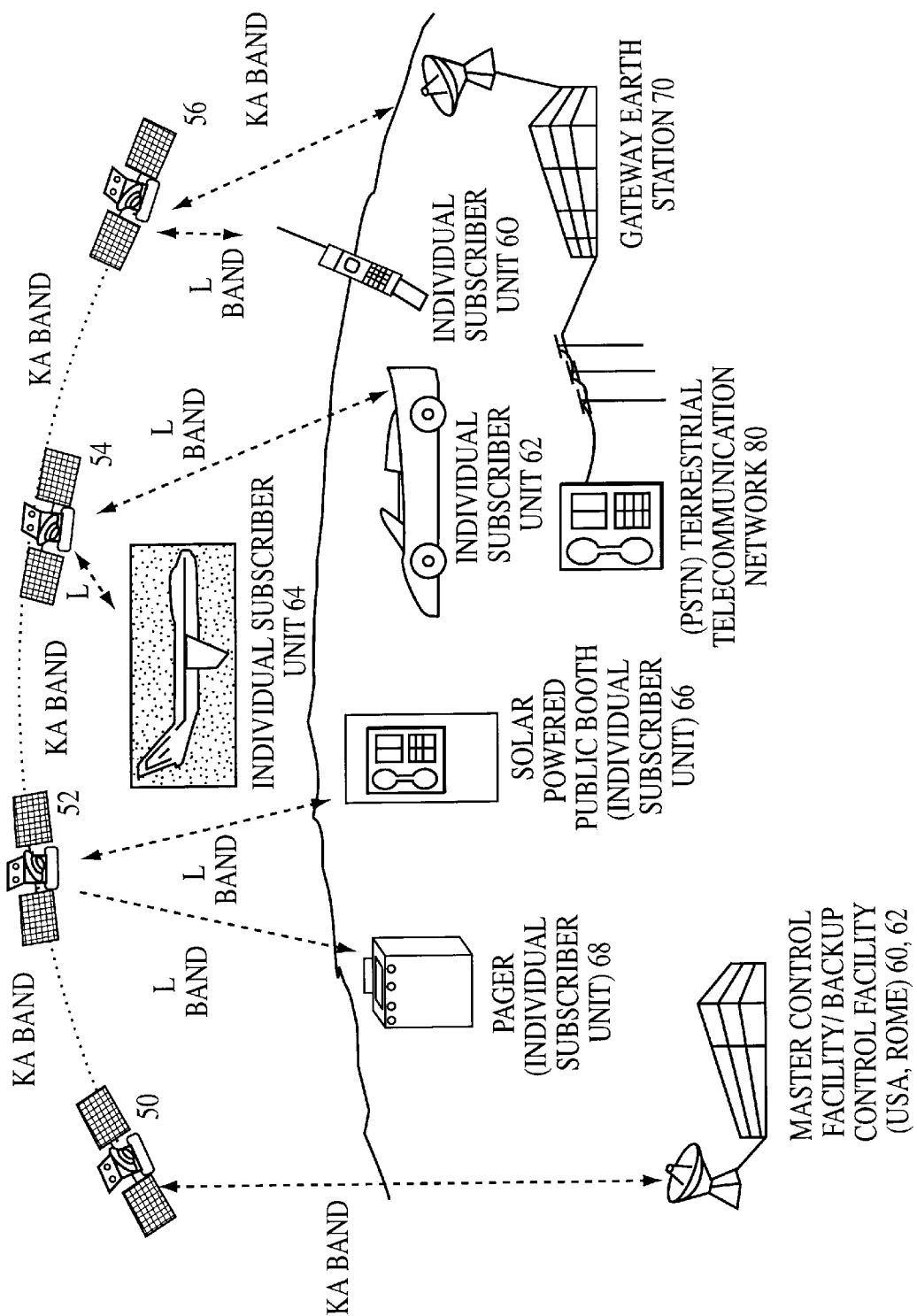
FIG. 1 is a schematic of the satellites in operative relationship with mobile users and public switched network users.
Figure 2:
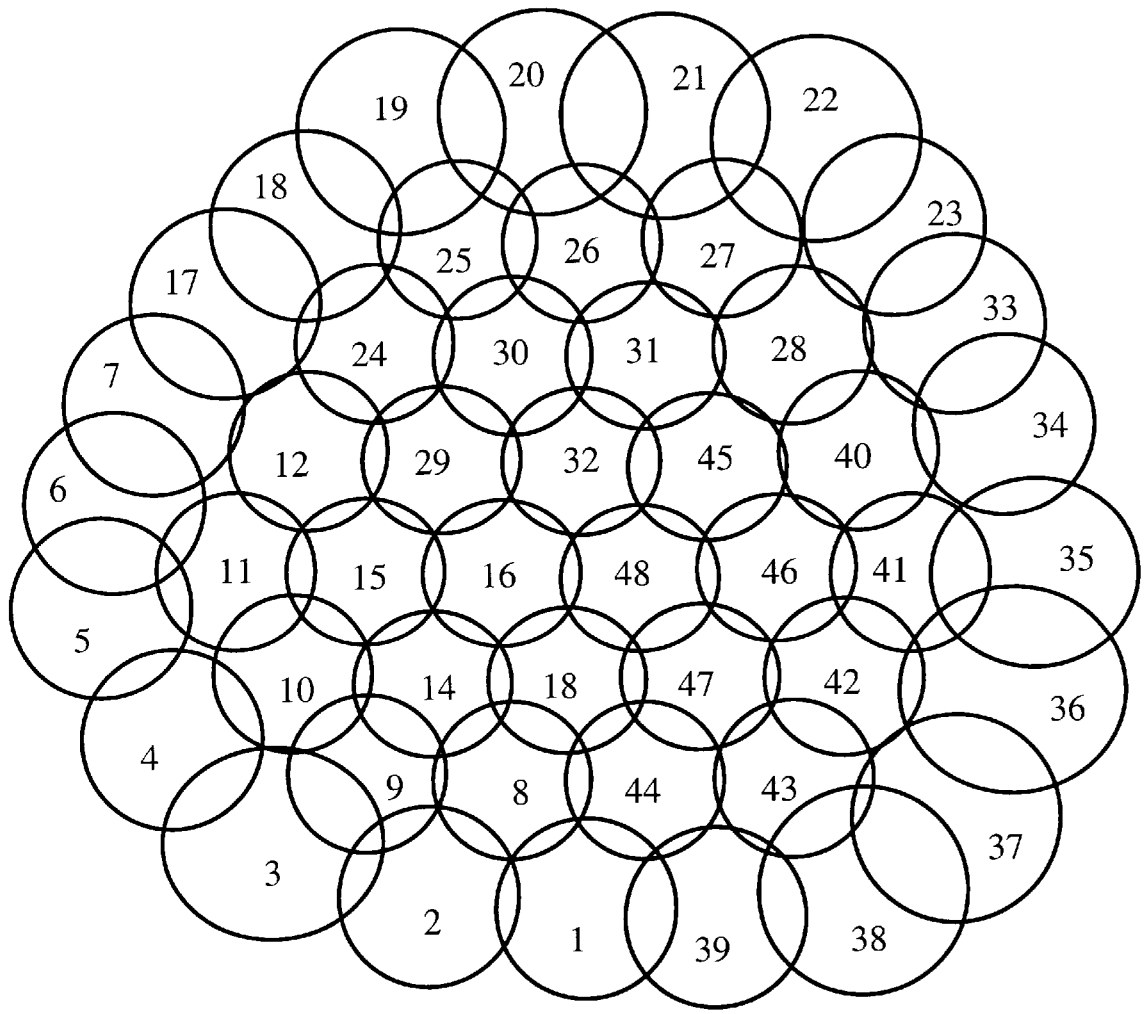
FIG. 2 is a schematic of a sample satellite beam footprint.
Figure 3:
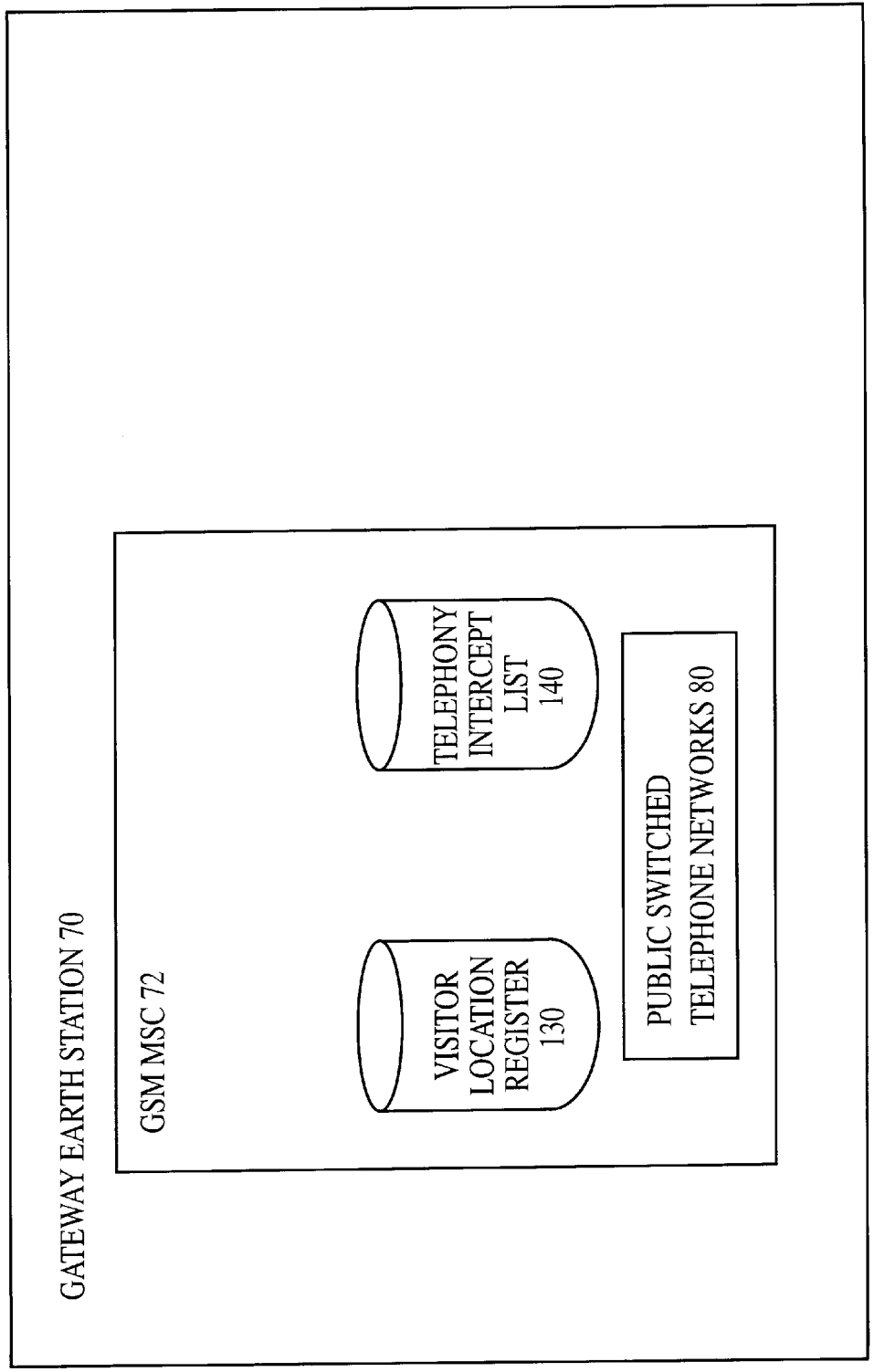
FIG. 3 is a schematic of the components of a standard gateway earth station.
Figure 4:
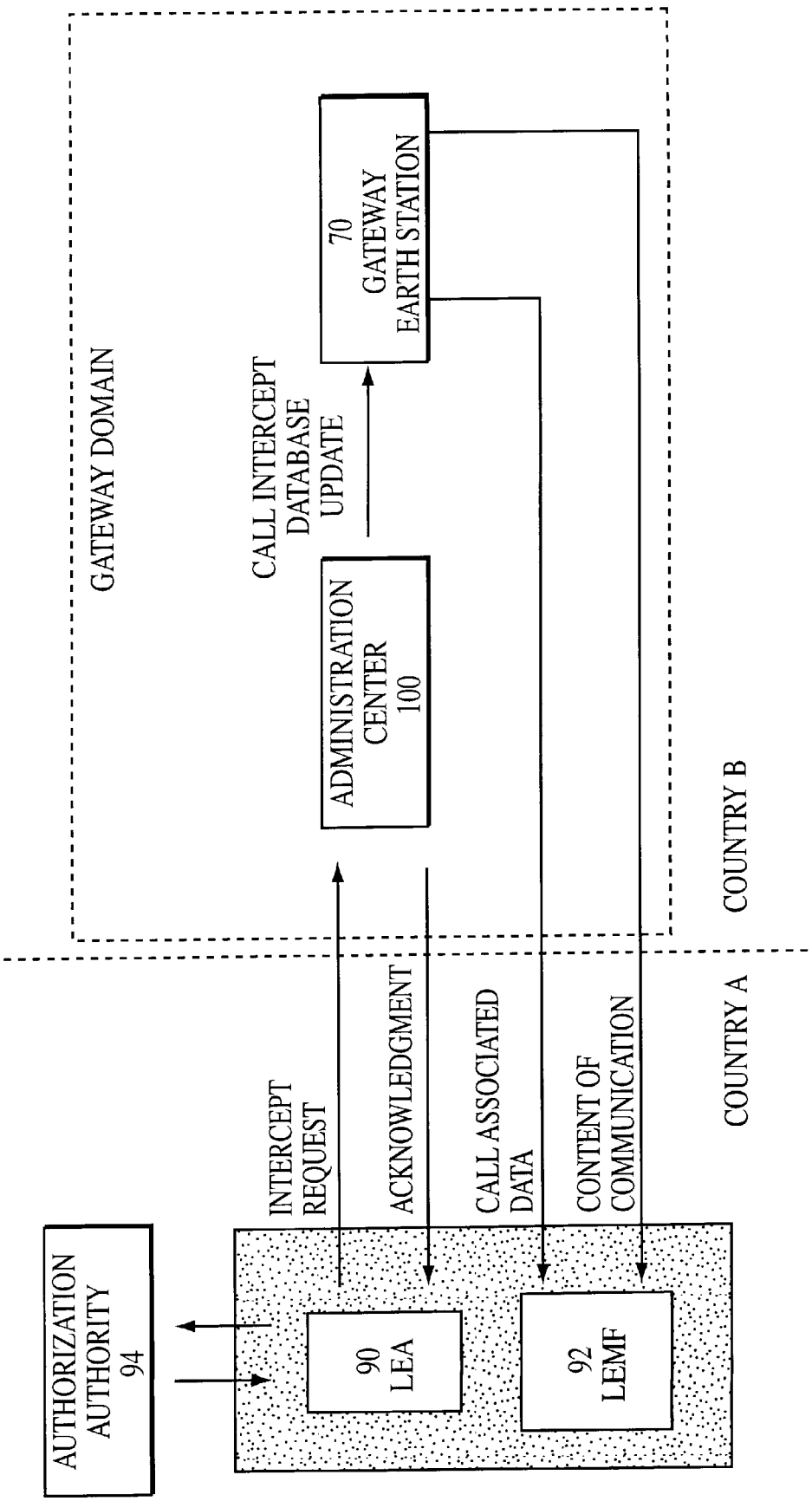
FIG. 4 is a schematic showing the operative components of a mobile satellite communications system having a centrally provisioned lawful call intercept capability.
Figure 5:
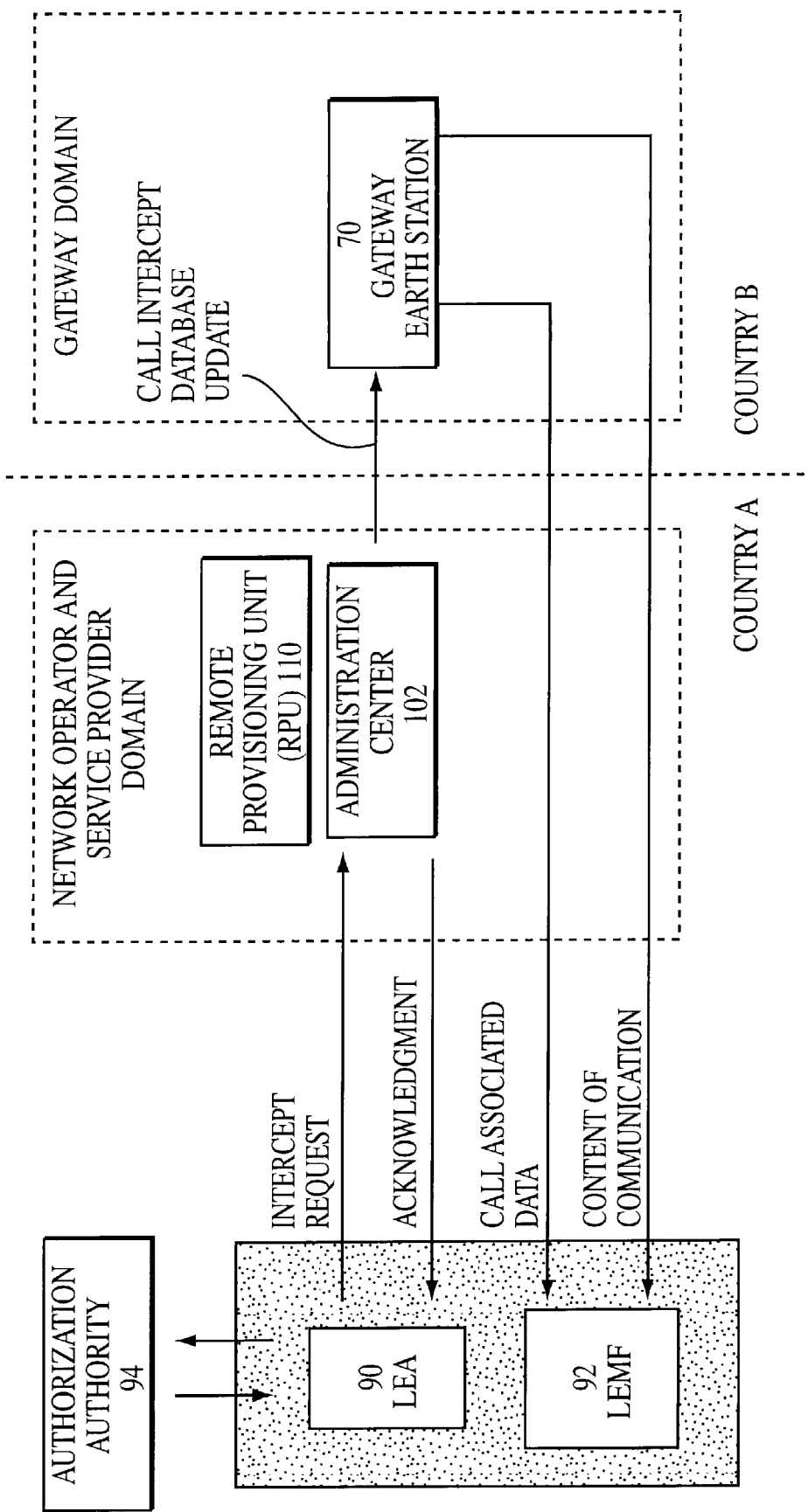
FIG. 5 is a schematic showing the operative components of mobile satellite communications system having a remote provisioned lawful call intercept capability.

The features that have been built into the global mobile satellite communications system to support its interception capability of the present invention are implemented in, for example, a global system for mobile communications mobile switching center GSM MSC 72 located at each gateway earth station 70, as illustrated in FIGS. 3–5. This is the point of interception within the system which is available to assist, for example, law enforcement agencies (LEAS) 90, i.e., an interception interface where access to the content of communication and call associated data can be provided to, for example, LEAs 90, or others who have the appropriate or lawful authorization to intercept.

An LEA 90 must generally request authorization from some national authorization authority 94. This request is to be processed and the authority 94, where appropriate, may grant the LEA 90 lawful authorization, under certain conditions, to intercept a set of specified telecommunications. Typically, this results in a warrant or order being issued by the authorization authority 94. This lawful authorization may describe the intercept or call associated data and the content of the communication that are allowed to be delivered for this LEA 90, investigation, period and interception target. A lawful authorization, where granted, is to be presented, for example, to the appropriate network operator and/or service provider.

The LEA 90 passes an Intercept Request message to the Administration Center 100, 102 of the appropriate operator, for example, in the country where the target of interception is located. The Administration Center 100, 102 may, for example, be at the facilities of the network operator or those of a service provider. This Intercept Request message is used to request, or to remove, the interception action. The form of this message could conceivably be electronic, paper (e.g., fax) or direct. The Administration Center 100, 102 is provided with the relevant identities, e.g., the MSISDN, the international phone number of the subscriber, of the call interception target from the information given in the Intercept Request message. These are entered into a telephony intercept list 140 located at the gateway earth station 70. An Acknowledgment message is returned back to the LEA 70 in response to this request informing the LEA that the lawful or other authorization has been accepted/received and acted upon.

Thereafter, the process causes a call intercept capability to be applied to the relevant target identity. The intercepted product, the content of the communication, e.g., voice or data, is passed back to the LEA 90 via the law enforcement monitoring facility (LEMF) 92. A parallel process generates an Intercept record, containing call associated data, e.g., called and calling party numbers, time of call and so on, which is also transferred to the LEMF.

During every subsequent call to/from the target subscriber, after the first interception action and within the period of the warrant, the MSISDN of the interception target is checked against the telephony intercept list. If a match is found, then the call is routed to the designated LEMF from where the targeted (incoming and outgoing) call is being placed.

Because a gateway earth station 70 in one country can serve LEA requests for interception in many other countries, there are, for example, two possible approaches for administering the warrants and processing Intercept Requests: by centralized provisioning or distributed remote access, as illustrated in FIGS. 4 and 5. Which of these two approaches is more appropriate generally depends on specific national requirements and the agreed arrangements with the licensed network operator in each of the countries the territory the gateway earth station 70 serves.

As shown in FIG. 4, Centralized Provisioning has the Administration Center 100 located at the gateway earth station facility 70. The Intercept Requests from LEAs 90 in each of the countries served by this gateway earth station 70 are sent to this Administration Center 100 for processing and to enter the target identities in the telephony intercept list 140.

This method provides centralized control and administration of warrants and uses fewer system elements. Also, fewer people are involved in the process. This approach may require a bilateral agreement between the government of the gateway earth station country and each of the participating countries, to be able to accept and process warrants from each country. The delivery of the intercept request messages to the Administration Center 100 could be by electronic means (via direct or indirect channels).

As illustrated in FIG. 5, in Distributed Remote Access Provisioning, the Administration Center 102 is located in each country. The Intercept Requests from LEAs 90 in a given country are sent to a respective Administration Center 102 to be processed based on, for example, a lawfully authorized warrant or order. To support such a remote access, the Remote Provisioning Unit (RPU) 110 has been devised to enable the Administration Center 102 to enter remotely the target identified in the telephony intercept list 140 located at the gateway earth station facilities 70.

This remote provisioning capability preferably ensures that RPU 110 access to the telephony intercept list 140 is appropriately controlled so that different LEAs 90 in each country have access to a partition of the telephony intercept list 140, and preferably only in connection with calls placed in their jurisdiction. This way of handling the provisioning of interception implies distributed control. Hence, the gateway earth station country does not need to handle the warrants. However, the need for agreement between some countries and the gateway earth station country regarding this process needs to be considered. Initialization of the call intercept action is in the hands of the country issuing the warrant.

Distributed remote access involves a greater number of system elements, and people and Administrative Centers 102 across all the countries. However, this method provides the advantage that the administration of warrants is carried out directly according to the national laws and practices within each country under real time, or near real time, conditions. Also, the RPU 102 is a standard system element that can be easily configured and connected to the gateway earth station 70.

The above processes regarding the call intercept process are merely examples of alternative processes, and any similar intercept process may be used in connection with the present invention.

A prerequisite to a call intercept occurring is that the identity of the target of interception, for example, the MSISDN or other suitable identifier, together with the directory number (DN) of the LEMF 92 having lawful authorization to intercept, is recorded in the telephony intercept list 140 located at the intercepting gateway earth station 70. The provision of intercepting calls is then implemented by adding an extra path in the call processing functions within the gateway earth station mobile switching center 72. This enables voice and/or data calls made by, or routed to, the intercept target to be routed to the monitoring facility 92 of the appropriate low enforcement agency across the hand-over interface described below. This extra path to the monitoring facility (LEMF) 92 is in one direction only. That is, it is a passive connection. Hence, the provision of call interception generally is implemented in such a way that the target of the interception is unaware that the call is being intercepted.

The hand-over interface transports administrative and intercept-related information, as well as the content of communications.

Information being delivered across the administrative interface includes, for example, LEA requests for intercept action and responses from the Administrative Center 100, 102 to such requests. Call-associated data sent across the hand-over interface includes the numbers of the called and calling party, and the time and duration of the call. This information is combined together as an intercept record and is generated at the beginning of each call. The content of the intercepted communications (voice/data) is routed to the appropriate LEMF 92.

The call intercept features are closely associated with the four roles that a gateway earth station 70 performs in processing calls. This is regardless of whether it is a mobile call which is terminated or originated on the PSTN 80 at the gateway earth station, or whether it is mobile to mobile. It is possible for one, two, three, four, or more separate gateway earth stations 70, and the like, to be involved in a call. The gateway earth station roles are:

the PSTN Interconnection role, the home Gateway earth station role which involves the management of a standard home location register (HLR), as in the GSM system, that holds subscriber data, such as services available and a subscriber's current location. This location information is stored in the gateway earth station 70 and updated when a subscriber's handset is moved to a new region, the visited gateway earth station role which controls the territory or geographical region in which the subscriber is currently located based on the location of the ISU 60, 62, 64, 66, 68. The PSTN 80 and visited gateway earth station roles perform the actual process of call set up. The visiting subscriber's record is stored in a standard visitor location register (VLR) 130, as in the GSM system, the forwarding gateway earth station role which is responsible for forwarding an incoming call destined for a subscriber to another directory number.

There are, for example, two types of communications that can be intercepted in the global mobile satellite communications system: telephony traffic (directed to or from subscribers) and messaging service traffic (directed to subscribers). The locations of the points of interception depend on the service being invoked and the specific scenario.

The telephony traffic includes both voice calls and data traffic. These may be the basic telephony services where calls are originated or terminated at the visited gateway earth station 70, or they may be supplementary services to support calls that have been forwarded. For example, calls that are forwarded if the called party is not-reachable, if there is no-reply or the called party is busy.

For the basic telephony services the point of intercept for both originating and terminating calls is the visited gateway earth station 70, regardless of the destination or origin of the call. With voice calls a single communications channel is used between the gateway earth station 70 and the LEMF 92. With data traffic two communications channels are used one for each direction, to and from the gateway earth station 70.

In the case of forwarded calls, the interception may involve a call whose origin or destination is not within the geographical boundaries of the gateway earth station territory. Even if the end points are within the gateway earth station territory, one or both end points may not be in the country that placed the request for interception. The point of interception for these types of call is the gateway earth station 70 responsible for forwarding the call, i.e., the forwarding gateway earth station role.

In the global mobile satellite communications system, there are many geographic regions which share a single standard gateway earth station. For example, in Europe, there are, for instance, over forty countries served by a single gateway earth station 70. Interestingly, in contrast, other mobile communications systems, such as cellular systems, do not serve multiple countries per mobile cellular switching system and, indeed, often have just one mobile cellular switching system per country.

However, in the world of mobile satellite communications of the present invention, all of the countries in Europe, for example, must share the same resources to use the call intercept capability. At the core of the resources is the telephony intercept list 140 on which are entered records in a standard format of individuals whose phones are to be monitored by, for example, duly authorized law enforcement agencies. However, there is a practical limit to the size of the telephony intercept list 140 because for every call that is placed, it is necessary to ensure that the placed call is not from or to a phone number on the list 140. The greater the size of the list 140, the longer it takes to determine whether a call is to be intercepted, and the longer a call will take to be processed. Currently, the size limit of the telephony intercept list 140 is on the order of a few thousand subscribers on a standard mobile satellite communications system.

I have determined that even such a seemingly large telephony intercept list 140, for example, servicing all of the European countries will eventually run into logistical problems. One solution would be to increase the number of subscribers on the telephony intercept list 140 to, for example, tens of thousands. Though technically possible, such a solution would necessarily exacerbate the above-mentioned lag time on call processing. That is, merely increasing the size of the telephony intercept list 140 would require every single call in the network to go through a database of up to, for example, tens of thousands entries to verify that the call need not be monitored. Such a solution would further consume time and resources and cause delays in call set-up. Also, because of the problems associated therewith, such a solution is not easily upwardly scalable.

I have discovered that not all of these possible few thousand entries are, in fact, fully active all the time. For example, because a law enforcement agency may get a court order authorizing a call intercept for a length of time, such as two weeks, the targeted subscriber may not even enter the network in which the court order is effective. The net result, I have discovered, is that the targeted subscriber entry is merely residing in the telephony intercept list 140, taking up system resources and increasing call processing time for verifying whether any of the myriad targeted subscriber entries in the telephony intercept list is applicable to each call. Further, I have determined that because subscribers register in the global mobile satellite communications system, all of the telephone numbers are not required to be active in the telephony intercept list, but are only required to be active when the user is registered in the system.

In accordance with the above, I have realized that the visitor location register 130 stored records of all of the active subscribers. With respect to call interception, only this group of subscribers is relevant. That is, call interception for inactive subscribers is unnecessary in the global mobile satellite communications system because only active and/or registered subscribers make or receive calls, and only such calls can be intercepted.

Figure 6:
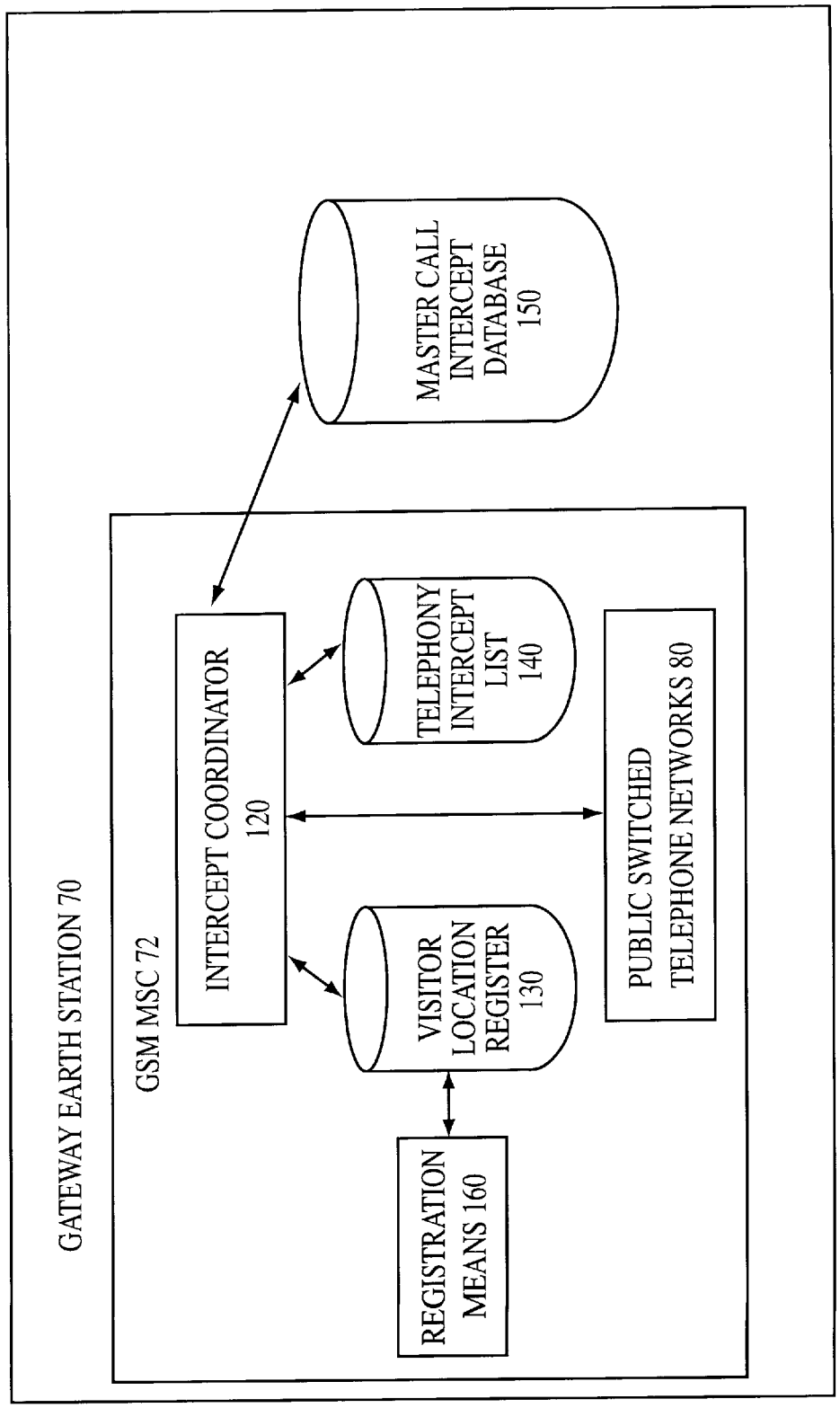
FIG. 6 is a schematic of a gateway earth station having components according to the instant invention.

Because of the importance of the subscriber records residing in the visitor location register 130, I developed an intercept coordinator 120 and a master call intercept database 150 to coordinate information stored in the standard visitor location register with that of the standard telephony intercept list, as illustrated in FIG. 6. The intercept coordinator 120 includes a software platform. The software performs its function without substantial interference with the operation of the other components in the standard global system for mobile communications mobile switching center (GSM MSC) 72 equipment in the gateway earth terminal, which is hard pressed for time and resources. Because the intercept coordinator 120 essentially advantageously operates outside of the GSM MSC 72 environment, it consumes little, if any, of the GSM MSC's resources. However, it is also within the scope of the invention to utilize the intercept coordinator 120 operating within the GSM MSC 72 environment, as well.

According to the invention, the telephony intercept list 140 stores only records of active and/or registered subscribers, who are the subject of call intercepts. The intercept coordinator 120 ensures a current telephony intercept list 140 by updating it when a subscriber enters, logs on, and/or registers with, the network, as reflected by the visitor location register 130. As soon as a subscriber is removed from the visitor location register 130, the intercept coordinator 120 will take the name or number out of the telephony intercept list 140.

As mentioned above, the GSM MSC 72 interrogates the activity of the ISUs 60, 62, 64, 66, 68 to update the visitor location register 130. The interrogation may be, for example, every two or three hours. Alternatively, the interrogation may be more or less frequent. Naturally, as ease of travel increases, the number of roaming subscribers will increase, which may require more frequent ISU interrogation than once every two or three hours. If the ISU is not active, the GSM MSC 72 will remove the record of it from the visitor location register 130.

The intercept coordinator 120 monitors the visitor location register 130 for call intercept targets found in the master call intercept database 150. The intercept coordinator 120 adds records of new subscribers in the visitor location register 130 who are call intercept targets, as indicated by the master call intercept database 150 to the telephony intercept list 140. Advantageously, the intercept coordinator 120 removes records from the telephony intercept list 140 of subscribers who may nonetheless remain on the master call intercept database 150, but are no longer in the visitor location register 130. Doing so will eliminate inactive call intercept targets from the telephony intercept list 140.

According the instant invention, if the GSM MSC 72 were to use the telephony intercept list 140 to provide passive connections at the gateway earth stations 70 to monitoring facilities 92, the GSM MSC 72 would significantly pan through less names in the telephony intercept list 140 than those in the master call intercept database 150.

Figure 7:
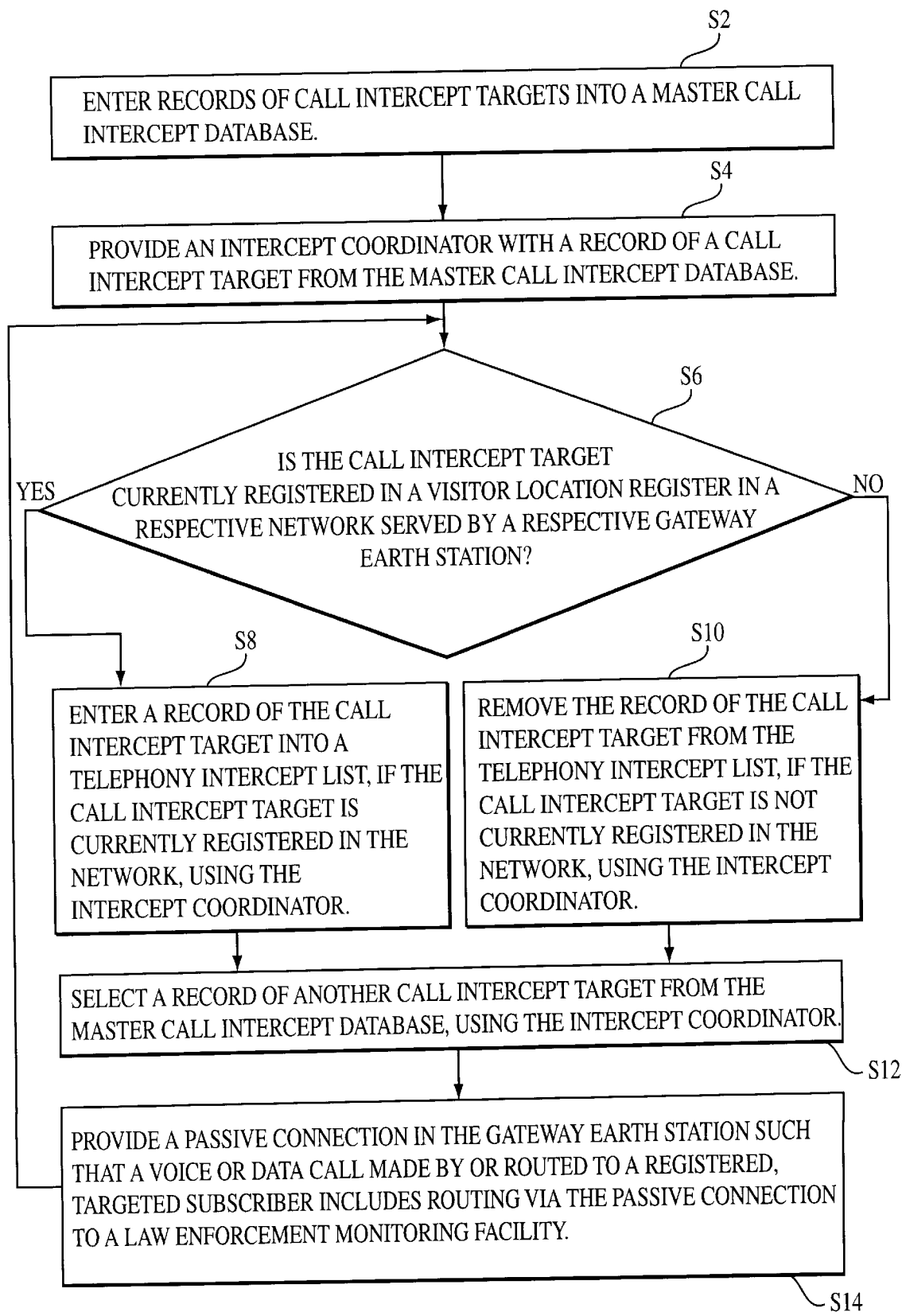
FIG. 7 is a flowchart of a possible method of operation of the instant invention.

Referring to FIG. 7, operation of the instant invention is described as follows. In Step S2, law enforcement agencies 90, for example, or other users, directly or indirectly, enter call intercept targets into the master call intercept database 150. In Step S4, the intercept coordinator 120 selects a record of a call intercept target from the master call intercept database 150. In Step S6, the intercept coordinator 120 verifies with the visitor location register 130 whether the call intercept target is currently registered in the network served by the respective gateway earth station 70.

If the visitor location register 130 includes a record of the call intercept target, then, in Step S8, the intercept coordinator 120 adds the record of the call intercept target to the telephony intercept list 140, provided that the list does not already include the record of the call intercept target. Otherwise, if the visitor location register 130 does not include a record of the call intercept target, then, in Step S10, the intercept coordinator 120 removes the record of the call intercept target from the telephony intercept list 140.

In Step S12, a record of another call intercept target on the master call intercept database 150 is selected using the intercept coordinator 120. Step S12 is implemented to ensure that this sequence is performed for all of the records in the master call intercept database. In Step S14, the GSM MSC optionally provides a passive connection to an appropriate monitoring facility, such as a law enforcement monitoring facility 92, when a voice or data call is made by or routed to any individual subscriber unit on the telephony intercept list 140. The sequence proceeds back to Step S6. Once all of the records in the master call intercept database 150 are verified against the visitor location register 130, the sequence starts again at predetermined or system operator-selected intervals.

It is to be understood that a) if a warrant has been issued and the target subscriber identified on the master call intercept database 150, and b) the target subscriber is currently not on the visitor location register 130, then substantially as soon as the target subscriber enters the area, registers, and starts using the phone, the call will be intercepted. That is, the process may occurr during a single call setup process.

Naturally, records in the master call intercept database 150 will be added and removed, as authorization for call interception is obtained and expires, respectively. Such an addition of a record may be performed at a central provisioning unit, namely, at the gateway earth station 70, as in FIG. 4.

Alternatively, the addition of a record may performed at a remote provisioning unit 110, as in FIG. 5, or other suitable facility. If the addition of the call intercept record is performed at a remote processing unit 110, each such remote processing unit for a given gateway earth station 70 is optionally linked to a shared master call intercept database 150, accessible by intercept coordinator 120 in the gateway earth station 70.

Each such remote processing unit may otherwise be optionally linked to individual master call intercept databases located at the site of the remote processing unit. In the latter case, the intercept coordinator 120 in the gateway earth station 70 may optionally compare one or more of the records of a master call intercept database 150 at a given remote processing unit 110 with those of the visitor location register 130 in the gateway earth station, before proceeding to a master call intercept database at another remote processing unit.

For completeness, it should be understood that call forwarding by a call intercept targeted subscriber will be unaffected by the instant invention. That is, use of the call forwarding feature would place the targeted subscriber in the visitor location register 130, as an active subscriber. The intercept coordinator 120 would recognize this targeted subscriber, as it would any other subscriber listed in the visitor location register 130, and then add the targeted subscriber to the telephony intercept list 140. As such, the targeted subscriber would be unable to avoid the call intercept by merely forwarding his calls, provided, for example, that his calls are forwarded to a jurisdiction permitting call intercept under the warrant.

The master call intercept database 150 optionally includes uncompressed records of the call intercept targets. Alternatively, the master call intercept database 150 includes at least partially digitally compressed records of call intercept targets. That is, the digitally compressed records may be used to minimize the data storage space requirements of the master call intercept database 150. Alternatively, the master call intercept database having digitally compressed records may maximize efficient use of the data storage space of the database by permitting an increased number of call intercept targets as compared to a master call intercept database having uncompressed records and occupying a same data storage space. For a master call intercept database 150 having digitally compressed records, the intercept coordinator 120 optionally decompresses the compressed record prior to reading it. Time will be consumed, if the intercept coordinator 120 is to decompress the records in the master call intercept database. Thus, determining which type of master call intercept database 150 to use in practice may include assessing the need for speed with which the intercept coordinator 120 is to operate.

The above-mentioned records, uncompressed or compressed, in the master call intercept database 150 may optionally be scrambled or encrypted. In such a case, the intercept coordinator 120 optionally unscrambles or deciphers a record prior to reading it.

The master call intercept database 150 optionally includes at least one authorized access level for adding or removing a record from the database. Such a feature would prevent unauthorized tampering with the records of the database 150. Optionally, the master call intercept database 150 may include a record removal query to safeguard against inadvertent removal of a record.

Optionally, the master call intercept database 150 may include an audit/logging feature to meet the security needs of this multiple country application and to safeguard against and trace unauthorized access.

The efficacy of the instant invention may depend, in part, on the rapidity with which the visitor location register 130 is updated. Thus, standard registration means may be provided to update, periodically or aperiodically, the visitor location register 130. For example, the present invention optionally provides for receiving a continually or intermittently emitted control signal from an ISU 60, 62, 64, 66, 68. The present invention includes the subscriber in the visitor location register 130, if the control signal is received. The present invention removes the subscriber from the visitor location register 130, if the control signal is not received.

Alternatively, a present invention optionally provides for polling an ISU 60, 62, 64, 66, 68. The instant invention includes the subscriber in the visitor location register 130, if the subscriber is active, and removes the subscriber from the visitor location register 130, if the subscriber is not active.

It is to be understood that the home location register (HLR), holding subscriber data, which optionally includes a subscriber's current location, may optionally be interrogated by the intercept coordinator 120 instead of, or in addition to, the visitor location register 130. In such a case, records of call intercept targets in the master call intercept database optionally include respective home location registers. Then, the intercept coordinator 120 may search for an intercept target whose record is listed in the master call intercept database against subscriber records located in the home location register noted in the master call intercept database. The home location register would then yield the current location of the intercept target. If the intercept target's current location is within the network served by the intercept coordinator 120, then the intercept coordinator may optionally enter a record of the targeted subscriber in the telephony intercept list 140 associated with the intercept coordinator at its gateway earth station 70.

One of ordinary skill in the art will appreciate that the instant invention is readily applied to other communications systems, requiring a call intercept capability. For example, the invention may be implemented in a satellite communications system without gateway earth stations, wherein the visitor location register 130, the telephony intercept list 140, and the master call intercept database 150 reside in one satellite or are shared by two or more satellites. Alternatively, the invention may be implemented in a ground-based wireless communications system, wherein a wireless switching center serves multiple jurisdictions in one or more countries. Such a wireless switching center would include the visitor location register 130, the telephony intercept list 140, and the master call intercept database 150.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

| ABBREVIATIONS | |
|---|---|
| ACCHL | Associated Control Channel, L-Band |
| AI | Access Identifier |
| BPSK | Binary Phase Shift Keying |
| CC | Call Control |
| CEPT | Conference Europeenne des Postes et Telecommunications |
| DE-BPSK | Differentially Encoded Binary Phase Shift Keying |
| DE-QPSK | Differentially Encoded Quaternary Phase Shift Keying |
| DTOOA/DFOA | Difference of Time of Arrival/Difference of Frequency of Arrival |
| EIRP | Effective Isotropic Radiated Power |
| ETSI | European Telecommunications Standards Institute |
| FDMA | Frequency Division Multiple Access |
| GE | Geopolitical Entity |
| GMPCS | Global Mobile Personal Communications by Satellite |
| GPS | Global Positioning System |
| GSM | Global System for Mobile Communications |
| HLR | Home Location Register |
| ISU | Individual Subscriber Unit |
| ITU-R | International Telecommunication Union - Radio Communication Bureau |
| kbps | kilo bits per second |
| ksps | kilo symbols per second |
| LAC | Location Area Code |
| LEA | Law Enforcement Agency |
| LEMF | Law Enforcement Monitoring Facility |
| LEO | Low Earth Orbit |
| LBP | L-Band Physical |
| LL | L-Band Link |
| MAP | Mobile Application Part |
| MM | Mobility Management |
| MOU | Memorandum of Understanding |
| MSC | Mobile Switching Center |
| MSC-MS | Mobile Switching Center to Mobile Subscriber |
| MSISDN | Mobile Station Integrated Services Digital Network |
| MSS | Mobile Satellite Service |
| MTD | Message Termination Devices |
| MXU | Multiplexed Unit |
| PSFD | Power Spectral Flux Density |
| PSTN | Public Switched Telephone Network |
| QPSK | Quadrature Phase Shift Keying |
| SABM | Set Asynchronous Balanced Mode |
| SIM | Subscriber Identity Module |
| TDD | Time Division Duplexed |
| TDMA | Time Division Multiple Access |
| TMSI | Temporary Mobile Subscriber Identification |
| T-T&C | Tracking, Telemetry, and Command |
| VLR | Visitor Location Register |

| -continued | |
|---|---|
| ABBREVIATIONS | |
| WRC | World Radio Conference |

GLOSSARY

Content of communications

The Information exchanged between two or more users of a telecommunications service, excluding intercept or call associated data. This included information which may, as part of some telecommunications service, be stored by one user for subsequent retrieval by another.

Handover Interface

A physical and logical interface across which the request and results of interception are delivered from an access provider/network operator/service provider to/from an law enforcement monitoring facility and/or a law enforcement agency.

Intercept or Call Associated Data

A collection of information or data associated with telecommunication services involving the target identity, specifically call associated information or data, service associated information or data or location information.

Interception Interface

The physical and logical locations within the network operator's telecommunications facilities where access to the content of communication and Intercept or call associated data is provided.

Interception Target

A person or persons, specified in a lawful authorization, whose telecommunications are to be intercepted.

Law Enforcement Agency (LEA)

An Organization authorized by a lawful authorization based on a national law to receive the results of telecommunications interceptions.

Law Enforcement Monitoring Facility (LEMF)

A law enforcement facility designated as the transmission destination for the results of interception relating to a particular interception target.

Lawful Authorization

Permission granted to an LEA under certain conditions to intercept specified telecommunications and requiring co-operation from a access provider/network operator/service provider. Typically this refers to a warrant or order issued by a lawfully authorized body.

Lawful Interception

The action (based on the low), performed by an access provider/network operator/service provider, of making available certain information and providing that information to an LEMF.

Mediation Device

A mechanism which passes information between on access provider or network operator or service provider and a handover interface.

Network Operator

A network operator operates the basic switched telecommunication network on which services are connected. The network operator is responsible for providing interception to the LEAs via the Handover Interface.

Service Provider

A service provider provides services, additional to those provided by the network itself, to users of a network. The service provider is responsible for making arrangements, which may involve a network operator, for the lawful interception of communications. A service provider may be the same organization as the network operator. Interception may be required for several service providers using the some telecommunication network.

What is claimed is:

1. In a global mobile satellite communications system, an apparatus for providing an interception capability, the global mobile satellite communications system including a plurality of communicatively linked satellites communicating with mobile users and a plurality of gateway earth stations operatively connecting the plurality of satellites to a plurality of public switched telephone networks, the mobile users communicating with public switched telephone network users via the plurality of gateway earth stations, the apparatus comprising:

a master call intercept database in a gateway earth station storing target records of subscribers of the global mobile satellite communications system targeted for call interception by law enforcement agencies;

a visitor location register in the gateway earth station storing active subscriber records of subscribers currently registered within a serviceable vicinity of a gateway earth station associated with the visitor location register;

a telephony intercept list in the gateway earth station storing active target records of registered subscribers targeted for call interception; and an intercept coordinator in the gateway earth station comparing the target records in said master call intercept database against the active subscriber records in said visitor location register, said intercept coordinator adding an active target record of a targeted subscriber to said telephony intercept list, when said visitor location register includes an active subscriber record of the targeted subscriber.

2. The apparatus according to claim 1, wherein said intercept coordinator removes the active target record of the targeted subscriber from said telephony intercept list, when said visitor location register does not include the active subscriber record of the targeted subscriber.

3. The apparatus according to claim 1, further comprising first registration means for receiving, one of periodically and aperiodically, a control signal from a subscriber in a vicinity of the gateway earth station and for updating said visitor location register by registering or removing an active subscriber record of the subscriber in the vicinity of the gateway earth station from said visitor location register.

4. The apparatus according to claim 1, further comprising second registration means for polling, one of periodically and aperiodically, a subscriber in a vicinity of the gateway earth station and for updating said visitor location register by registering or removing an active subscriber record of the subscriber in the vicinity of the gateway earth station from said visitor location register.

5. The apparatus according to claim 1, further comprising means for providing a passive connection in the gateway earth station such that a voice or data call made by or routed to a registered, targeted subscriber includes routing via the passive connection to a monitoring facility.

6. The apparatus according to claim 1, further comprising means for transferring at least one data record pertaining to an intercepted call from the gateway earth station to a monitoring facility.

7. A method of providing a call interception capability in a global mobile satellite communications system including a plurality of communicatively linked satellites communicating with mobile users, a plurality of gateway earth stations operatively connecting the plurality of satellites to a plurality of public switched telephone networks, the mobile users communicating with public switched telephone network users via the plurality of gateway earth stations, said method comprising the steps of:

1) entering a target record for each of at least one call intercept target into a master call intercept database in a gateway earth station;
2) providing an intercept coordinator in the gateway earth station with a target record of a first call intercept target from the master call intercept database;
3) confirming with a visitor location register in the gateway earth station, using the intercept coordinator, whether the call intercept target is currently registered in a respective network served by a respective gateway earth station;
4) entering an active target record of the call intercept target into a telephony intercept list in the gateway earth station, when the call intercept target is currently registered in the visitor location register, using the intercept coordinator;
5) selecting a target record of another call intercept target from the master call intercept database by the intercept coordinator;
6) providing a passive connection in the gateway earth station such that a voice or data call, made by or routed to a subscriber listed in the telephony intercept list, includes routing via the passive connection to a law enforcement monitoring facility; and
7) repeating said confirming step (3) through said passive connection providing step (6) until all records of the master call intercept database have been selected at least once.

8. The method according to claim 7, further comprising the step of removing from the telephony intercept list an active target record of a call intercept target not currently registered in the visitor location register.

9. The method according to claim 7, further comprising the step of receiving, one of periodically and aperiodically, a control signal from a subscriber in a vicinity of the gateway earth station and for updating said visitor location register by appropriately registering or removing an active subscriber record of the subscriber in the vicinity of the gateway earth station from the visitor location register.

10. The method according to claim 7, further comprising the step of polling, one of periodically and aperiodically, a subscriber in a vicinity of the gateway earth station and for updating said visitor location register by appropriately registering or removing an active subscriber record of the subscriber in the vicinity of the gateway earth station from the visitor location register.

11. An apparatus for providing a call interception capability in a communications system, said apparatus comprising:

(1) means for entering a target record of each of at least one call intercept target into a master call intercept database;
(2) means for providing an intercept coordinator with a target record of a first call intercept target from said master call intercept database;
(3) means for confirming with a visitor location register, using said intercept coordinator, whether the call intercept target is currently registered in a respective network served by said visitor location register;
(4) means for entering an active target record of the call intercept target into a telephony intercept list, if the call intercept target is currently registered in said visitor location register, using said intercept coordinator;
(5) means for selecting a target record of another call intercept target from the master call intercept database;
(6) means for providing a passive connection to a call intercept monitoring facility such that a voice or data call made by or routed to a registered, targeted subscriber includes routing via the passive connection to the monitoring facility;
(7) means for repeatedly using said confirming means (3) through said passive connection providing means (6) until all records of said master call intercept database have been selected at least once.

12. The apparatus according to claim 11, further comprising means for removing from the telephony intercept list an active target record of a call intercept target not currently registered in said visitor location register.

13. The apparatus according to claim 11, further comprising means for receiving, one of periodically and aperiodically, a control signal from a subscriber in a vicinity of said visitor location register and for updating said visitor location register by appropriately registering or removing an active subscriber record of the subscriber in the vicinity of said visitor location register from the visitor location register.

14. The apparatus according to claim 11, further comprising means for polling, one of periodically and aperiodically, a subscriber in a vicinity of said visitor location register and for updating said visitor location register by appropriately registering or removing an active subscriber record of the subscriber in the vicinity of said visitor location register from the visitor location register.

15. In a communications system including a visitor location register storing active subscriber records of subscribers currently registered within a serviceable vicinity and a master call intercept database storing target records of subscribers of the communications system targeted for call interception, an apparatus for providing a call intercept capability, comprising:

an active call intercept list database storing active target records of registered subscribers targeted for call interception; and
an intercept coordinator responsively connected to said active call intercept list database, comparing the target records in the master call intercept database against the active subscriber records in said visitor location register, and adding an active target record of a targeted subscriber to said active call intercept list when said visitor location register includes an active subscriber record of the targeted subscriber.

* * * * *